June 30, 1970 R. P. MILES 3,517,791
RAMPS
Filed Sept. 27, 1968 2 Sheets-Sheet 1
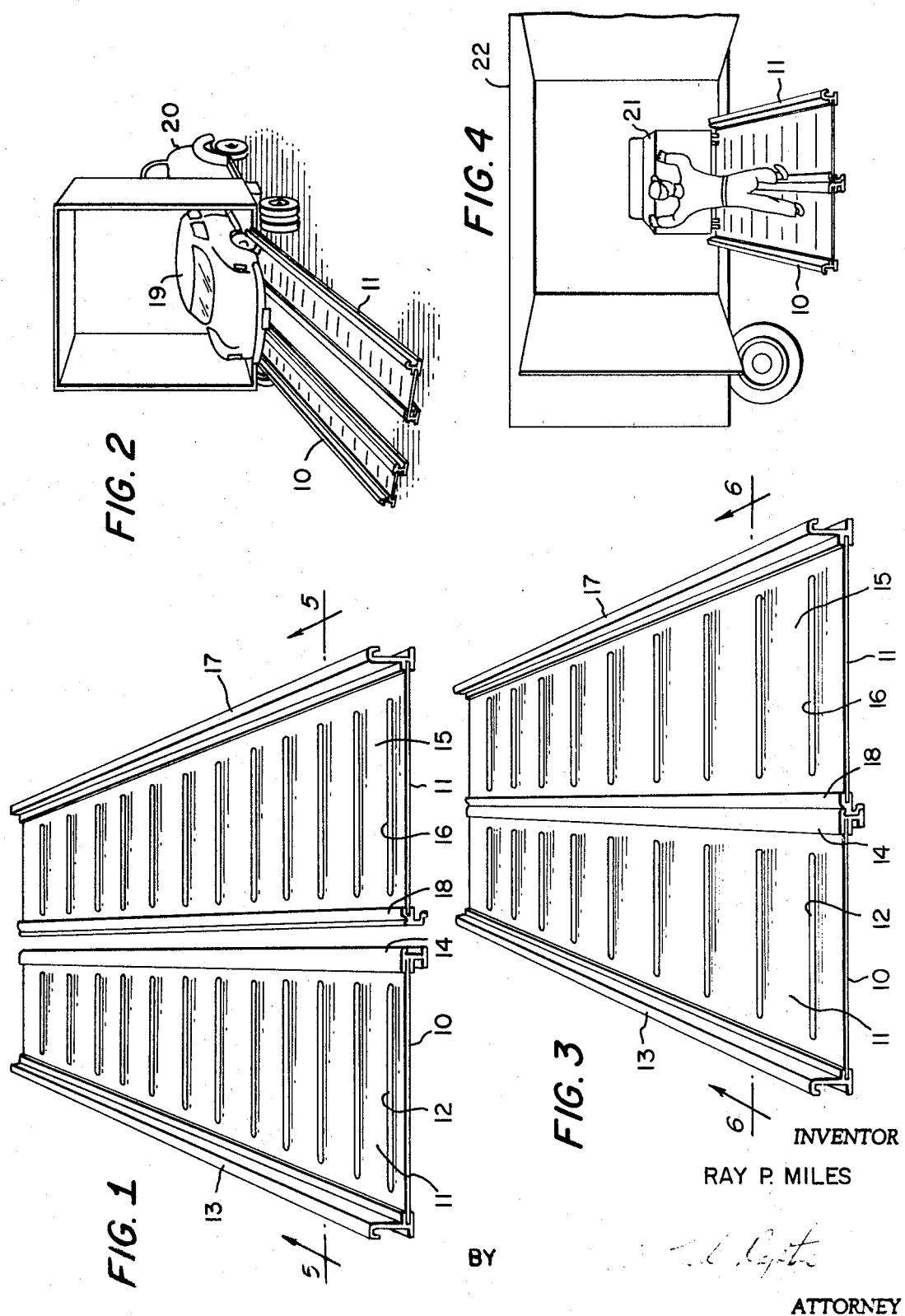
INVENTOR
RAY P. MILES
BY
ATTORNEY

INVENTOR
RAY P. MILES

BY
ATTORNEY

United States Patent Office 3,517,791
Patented June 30, 1970

3,517,791
RAMPS
Ray P. Miles, 8575 W. Melody Lane,
Macedonia, Ohio 44056
Filed Sept. 27, 1968, Ser. No. 763,318
Int. Cl. B65g 11/02; E01d 15/12
U.S. Cl. 193—41                                                  2 Claims

ABSTRACT OF THE DISCLOSURE

The invention relates to ramps useful for loading and unloading cargo from trucks and the like. A pair of ramps are provided which may be used separately to provide flexibility of use. The pair may be used in a parallel engaged position to provide a wider ramp surface for handling wider cargo. Interlock means are provided on each ramp for purposes of engaging the ramp together.

---

This invention relates to a novel ramp combination useful for loading and unloading cargo from trucks and the like to a ground level.

FIG. 1 is a perspective view of the pair of ramps disengaged;

FIG. 2 is a perspective view of the pair of ramps disengaged and in position on a truck showing one use thereof;

FIG. 3 is a perspective view of the pair of ramps engaged;

FIG. 4 is a perspective view of the pair of ramps engaged and in position on a truck showing another use thereof;

Figure 5:
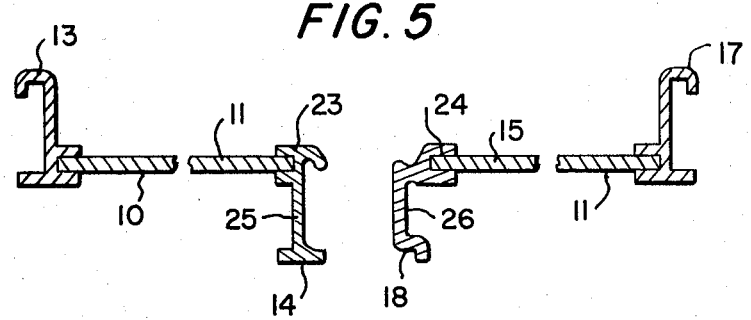
FIG. 5 is an end sectional view partially broken, along line 5—5 of FIG. 1 particularly disclosing the one embodiment of interlock means between the pair of ramps.

Referring to FIG. 1, a pair of ramps 10 and 11 are shown which are intended to be used together for loading and unloading in a non-engaged position as shown in FIG. 2 or in an engaged position as shown in FIGS. 3 and 4. The ramp 10 is provided with flooring 11 containing treading 12. A curb 13 is secured to the flooring on one side and on the other side a female member 14 of the the interlock.

Ramp 11 is similar to ramp 10 comprising flooring 15, treading 16 and curb 17. A male interlock member 18 is secured to the flooring 15 and is adapted to engage the female interlock 14 of ramp 10.

In FIG. 2, the ramps are used in a non-engaged manner providing a pair of ramps for driving a vehicle 19 from ground level into the body of a truck 20. In FIG. 4, the ramps are used in an engaged manner providing a wide ramp for moving wider objects 21 into a truck body 22 from ground level.

Figure 6:
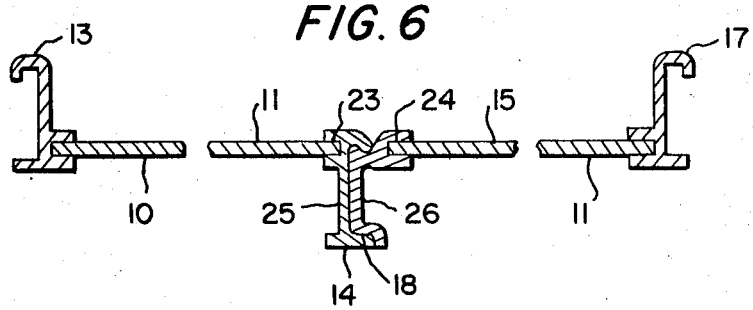
FIG. 6 is the same as FIG. 5 except that the ramps are in an engaged position.

FIGS. 5 and 6 show the details of the interlock in greater detail especially the manner in which the male member 18 interlocks the female member 14. The female member 14 has a recessed area 23 to which the flooring 11 is welded. Similarly, male member 18 has a recessed area 24 to which flooring 15 is welded. The female and male members are designated to have bodies 25 and 26 to provide strength to the interlock.

Figure 7:
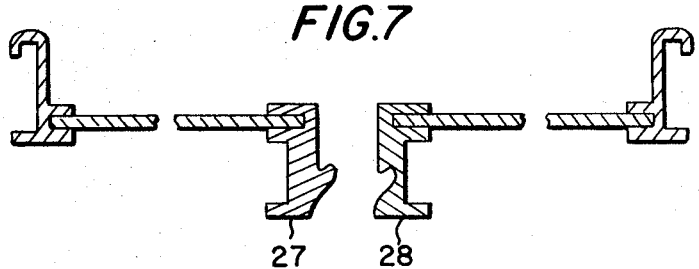
FIG. 7 is an end sectional view, partly broken, particularly disclosing another embodiment of interlock means; and along line 6—6 of FIG. 3.
Figure 8:
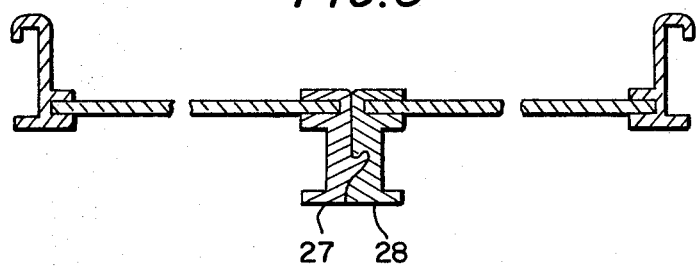
FIG. 8 is the same as FIG. 7, except that the ramps are in an engaged position.

FIGS. 7 and 8 show another embodiment of the interlock wherein a male member 27 interlocks female member 28.

While a specific embodiment of the invention has been described, it is to be understood that the invention is not limited to the specific features shown and various changes may be made in its construction by those skilled in the art, without departing from the spirit of the invention as defined by the appended claims.

What is claimed is:
1. A pair of ramps comprising a first ramp provided with flooring and male interlock means along a longitudinal side of said first ramp, a second ramp provided with flooring and a female interlock means along a longitudinal side of said second ramp, said male and female interlock means extending along substantially the entire length of said sides and adapted to be interlocked together whereby said ramps together provide a combined ramp surface.
2. The ramps of claim 1 wherein the longitudinal sides opposite said interlock means are provided with curbing.

References Cited

UNITED STATES PATENTS 1,568,303   1/1926   Webster _____ 14—72
3,088,568   5/1963   Troy _____ 193—38

FOREIGN PATENTS 1,148,982   7/1957   France.

MILTON BUCHLER, Primary Examiner
J. E. PITTENGER, Assistant Examiner

U.S. Cl. X.R.
14—72; 214—85